May 16, 1944.   M. WARE   2,348,941
VIBRATION DAMPING DEVICE
Filed Dec. 5, 1942   2 Sheets-Sheet 2

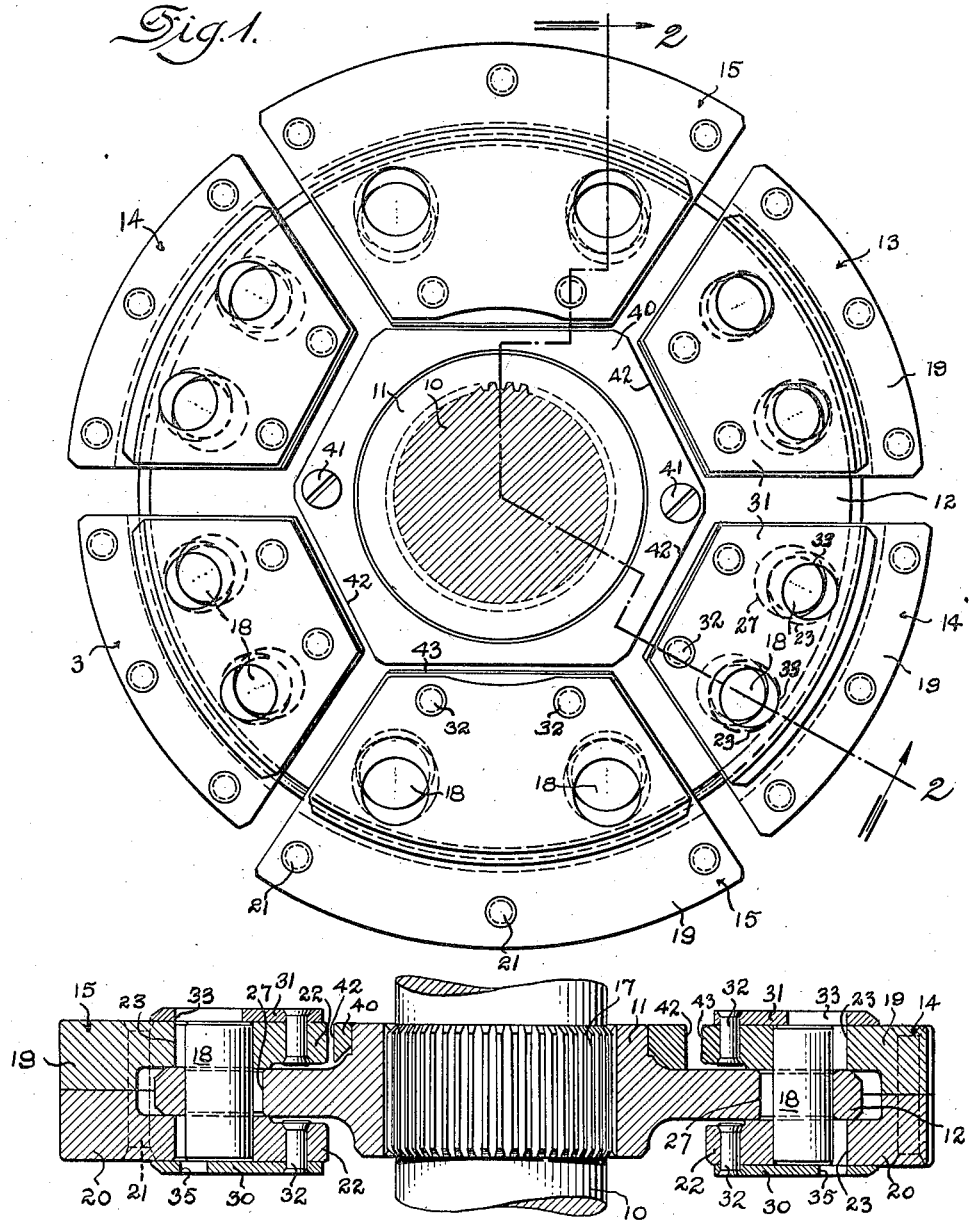

INVENTOR.
MARSDEN WARE
BY Sibbetts & Hart
Attorneys.

Patented May 16, 1944

2,348,941

UNITED STATES PATENT OFFICE 2,348,941

VIBRATION DAMPING DEVICE

Marsden Ware, Huntington Woods, Mich., assignor to Packard Motor Car Company, Detroit, Mich., a corporation of Michigan Application December 5, 1942, Serial No. 467,915

5 Claims. (Cl. 74—574)

This invention relates to improvements in means for minimizing the effect of undesirable vibrations and is particularly concerned with pendulum damping of torsional vibrations in elastic rotatable driving systems.

It is an object of the invention to provide an improved torsional vibration damper of the pendulum type which may be readily assembled and locked together as a unit for mounting directly on a shaft in a driving system.

Another object of the invention is to provide a torsional vibration damper, of the type shown in Patent No. 2,112,984 dated April 5, 1938, in which the pendulum masses can have a relatively large angle of swing.

Another object of the invention is to provide an improved torsional vibration damper having different types of pendulum masses for eliminating a plurality of different resonant disturbances in an elastic rotational driving system.

Still another object of the invention is to provide a torsional vibration damper for a shaft in which inertia masses of the pendulum type may be readily applied and locked to a carrier.

Other objects of the invention will appear from the following description taken in connection with the drawings, which form a part of this specification, in which:

Fig. 1 is an elevational view of one end of a torsional vibration damper, the shaft on which it is mounted being shown in section;

Fig. 2 is a sectional view of the damper taken on line 2—2 of Fig. 1;

Figure 3:
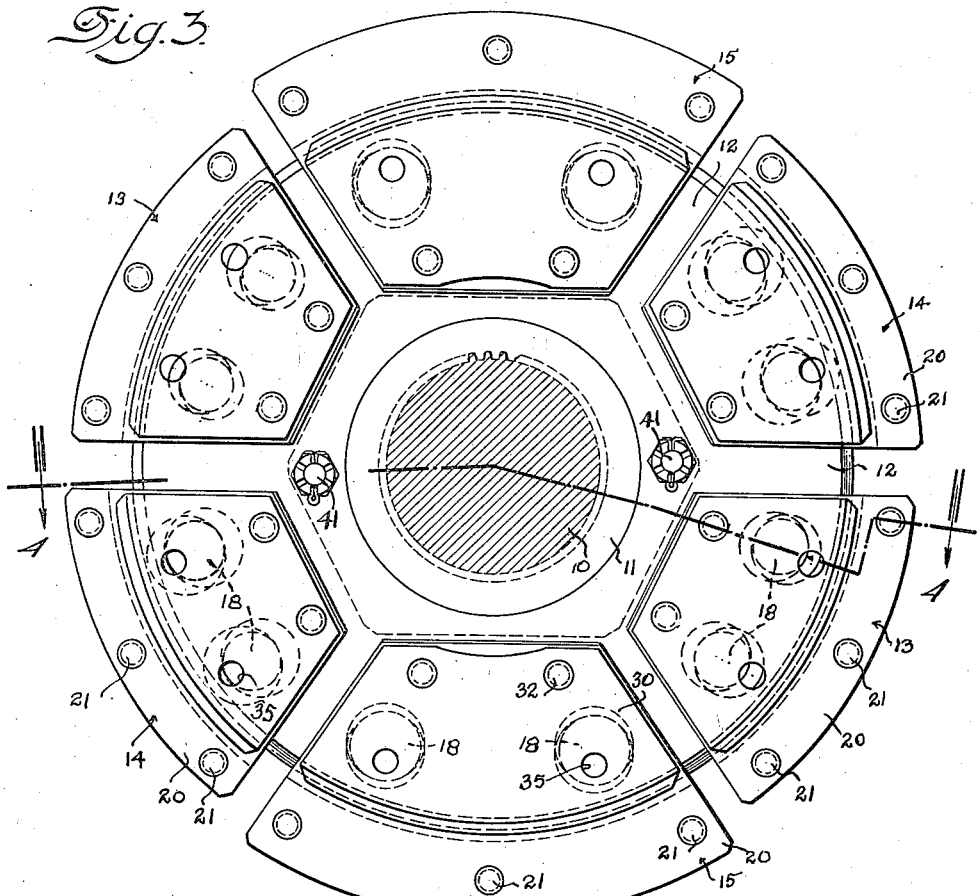
Fig. 3 is an elevational view of the other end of the damper.
Figure 4:
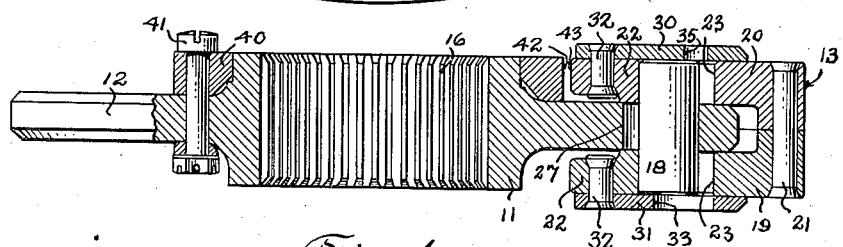
Fig. 4 is a sectional view of the damper taken on line 4—4 of Fig. 3.

The vibration damping device is designed to be assembled as a unit and, as such, to be applied to or removed from a shaft 10 in a rotational elastic system, which shaft may be the crankshaft of an internal combustion engine. The device has a support member consisting of a hub 11 and a disk flange 12 extending outwardly from a central portion of the hub. Pairs of inertia masses 13, 14 and 15 are connected to rotate with the support member through connection with the hub flange, and the number of the pairs of masses applied to the flange can be selected and formed in accordance with the different resonant torsional vibration disturbances desired to be absorbed. The masses of each pair should be similar and disposed oppositely relative to the shaft. Internal splines 16 are formed on the hub for engagement with splines 17 on the shaft and when such splines are engaged the support member will be fixed to rotate with the shaft.

The masses are bifurcated to straddle the hub flange and are each connected with the hub flange by a pair of cylindrical pins 18. For sake of manufacturing convenience, the masses consist of two sections 19 and 20 that are secured together by rivets 21, such sections being formed with spaced legs 22 that straddle the hub flange. Openings 27 are formed in the hub flange to receive the pins and similar openings 23 are formed in the legs of the masses for receiving the pins. The diameters of openings 23 and 27 are similar and they are larger in diameter than the pins thus allowing a swinging pendulum movement of the masses relative to the hub flange in response to centrifugal force.

Retainer means, to prevent axial displacement of the pins after assembly in the openings in the hub flange and masses, is provided and plates 30 and 31 can be secured to the end faces of the masses by rivets 32 for such purpose. Plates 30, formed with openings 35, extend across the pin openings in the legs at one end of the masses while plates 31, formed with openings 33, extend across the pin openings in the legs at the other end of the masses. Openings 33 are slightly greater in diameter than the adjacent pins and are located so that they can be aligned with openings 23 and 27. Thus, the masses must be moved toward the shaft a certain distance while straddling the hub flange, to insert and remove the pins from the unit, as otherwise the retainer plates 31 will partially enclose the pins. When the openings 33 align with the pins, the pins can be dislodged axially by pushing a suitable instrument through openings 35.

The hub is provided with detachable means, preferably in the form of a hexagonal ring member 40, for limiting inward movement of the masses sufficiently to prevent openings 33 from aligning with the pins. This ring member is applied to one end of the hub so as to be positioned interiorly of the legs at the corresponding end of the masses and can be detachably secured to the flange by suitable means, such as bolts 41. The hexagonal perimeter of the ring member provides straight surfaces 42 corresponding to and substantially parallel with similar adjacent base surfaces 43 on the legs of the masses and acts as a stop for limiting inward movement of the plates sufficiently to prevent the pins from being axially displaced.

In order to assemble the absorber device, the masses are moved radially inward on the hub flange, before ring member 40 is applied to the hub, until openings 33 align with openings 27 and 23. When such openings are concentric, the pins are inserted into operative position. After inserting the pins, the masses are moved outwardly to misalign openings 33 and the pins, whereupon the ring member 40 is applied to the hub and secured by bolts 41. The ring member limits the angle in which the masses can swing and such limitation will prevent openings 33 from aligning with the pins. The damper unit will be held together by the pins until the ring member is removed from the hub to permit displacement of the pins.

The solid cylindrical form of the pins allows them to be processed readily to an accurate round and provides a sturdy construction for the very large centrifugal forces to which they are subjected. The ends of the pins lie within openings 33 in the legs of the masses and make possible a maximum angle of pendulum swing of the masses without striking the stop ring. Because of such permissible swing it is possible, with the same length pendulum, to use masses of lighter weight than when restricted by end flanges as shown in the previously mentioned patent.

In order to reduce the cost of manufacture, the pairs of masses 13 and 14 can be formed, in the main, of similar parts. Sections 19 and 20 and the securing rivets 21 can be the same for both masses, and the cover plates 30 and the securing rivets 32 can be the same with the exception of the diameter of openings 33. The pins 18 for each pair of masses 13 and 14 are of different diameter and the openings 33 conform to the diameter of the pins in the associated mass. The openings 23 and 27 are alike, so by using different diameter pins, the two pairs of masses have pendulum swings of different lengths. The pins in masses 14 are of smaller diameter than the pins in masses 13, and thus, masses 14 will form a longer pendulum than masses 13. Masses 13 and 14 are thus tuned differently to damp two different vibrational disturbances in the elastic rotational system. The larger pair of masses 15 are designed to damp the most serious vibrational disturbance occurring in the system.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A vibration damper for a shaft comprising a support member fixed to rotate with the shaft, a pendulum inertia mass, the member and the mass having similar openings therethrough, cylindrical pins mounted to extend across the openings in rolling contact with the member and the mass, said pins being smaller in diameter than the openings, and plates attached to the mass in relation to at least partially overlie the ends of the pins during the possible swing of the mass, one of said plates having openings that can be aligned with the openings in the member and the mass, through which the pins can be inserted into and removed from the openings in the member and the mass.

2. A vibration damper for a shaft comprising a flanged hub fixed to rotate with the shaft, a pendulum inertia mass having legs straddling the hub flange, said hub flange and mass having radially offset openings therethrough, cylindrical pins in the openings in rolling contact with the flange and the mass, said pins having a smaller diameter than the openings, and plates fixed to the legs of the mass over the ends of the pins, one of said plates having openings corresponding in diameter to the pins and adapted to align with the pins in a position of the mass beyond the possible angle of swing, the other of said plates having openings smaller in diameter than the pins through which pin displacement means can be inserted.

3. A pendulum vibration damper for a rotating shaft comprising a flanged hub fixed to rotate with the shaft, inertia masses straddling the hub flange and movable relative thereto, said hub flange and masses having openings therethrough of similar diameter and adapted to be moved into concentric relation, cylindrical pins in said openings for connecting the masses with the hub flange, said pins being of smaller diameter than the openings, means fixed to the end faces of the masses and overlying the openings therein, one of said means on each mass having openings therethrough, the diameter of the pins being slightly less than that of the openings in said means, and detachable means applied to the flanged hub for limiting the angle of swing of the masses whereby the openings in the overlying means and the masses can not align with the pins when the damper is assembled.

4. A pendulum vibration damper for a rotating shaft comprising a hub with an outwardly extending flange fixed to rotate with the shaft, bifurcated pairs of inertia masses having legs straddling the hub flange, said flange and legs having radially offset openings therein, pins extending through the openings in the hub flange and projecting into the openings in the legs, said openings being similar and of larger diameter than the pins, means on the end faces of the masses at least partially covering the openings in the legs, the cover means on one end of the masses having openings therethrough adapted to be aligned with openings in the adjacent leg through which the pins can be moved, and means applied on the hub after the pins have been inserted into the openings in the hub flange and the legs of the masses for restricting pendulum movement of the masses sufficiently to maintain the openings in the cover means out of alignment with the pins.

5. A vibration damper for a rotating shaft comprising a flanged hub adapted to be fixed on the shaft, inertia masses composed of secured together sections having legs straddling the hub flange and movable relative thereto, said hub flange and legs having registerable openings therethrough in a direction axially of the hub, pins of smaller diameter than the openings and insertable therein, means on said masses preventing endwise displacement of the pins from the openings except when the openings are concentric, and a ring applied to the hub, after the pins are positioned in the openings, having angularly disposed peripheral edge portions acting as stops for the masses to limit their angle of swing and thereby prevent displacement of the pins.

MARSDEN WARE.